US006462260B2

(12) United States Patent
Fediakov

(10) Patent No.: US 6,462,260 B2
(45) Date of Patent: Oct. 8, 2002

(54) COMBINATION CARRYING CASE AND STAND FOR MUSICAL INSTRUMENTS

(76) Inventor: Alexandre Fediakov, 580 W. Kingway Dr., Deltona, FL (US) 32725

(*) Notice: Subject to any disclaimer, the term of this patent is extended or adjusted under 35 U.S.C. 154(b) by 0 days.

(21) Appl. No.: 09/777,071

(22) Filed: Feb. 5, 2001

(65) Prior Publication Data

US 2002/0104426 A1 Aug. 8, 2002

Related U.S. Application Data

(60) Provisional application No. 60/263,310, filed on Jan. 22, 2001.

(51) Int. Cl.[7] .................................................. G01D 3/00

(52) U.S. Cl. ............................ 84/327; 84/421; 84/453; 206/314; 206/14

(58) Field of Search .......................... 84/327, 421, 453; 206/314, 14

(56) References Cited

U.S. PATENT DOCUMENTS 2,231,235 A * 2/1941 Weir .......................... 206/314

* cited by examiner

*Primary Examiner*—Shih-Yung Hsieh
(74) *Attorney, Agent, or Firm*—James M. Matulis, Esq.; Stacy A. Gallagher, Atty.; Fowler White Boggs Banker, P.A.

(57) ABSTRACT

A combination case and stand for musical instruments or other items that when used in transport, has the appearance and simple functionality of a standard case. To function as a stand, the top can be completely removed, and the bottom portion which holds the item is fabricated with a joint such that it can fold into a stable stand configuration. When folded into the stand configuration, the joint becomes the top of the stand, and the rigid segments on each side of the joint become the supporting sides. In the stand configuration, the musical instrument or other item is supported in a slanted but upright position within one of the supporting sides. An additional feature of the present invention is a drop-down shelf that can lie flat and function as a pocket in the case configuration, and drop down to serve as a shelf in the stand configuration.

11 Claims, 6 Drawing Sheets

COMBINATION CARRYING CASE AND STAND FOR MUSICAL INSTRUMENTS

CROSS-REFERENCE TO RELATED APPLICATIONS

The present application claims the benefit of previously filed co-pending Provisional Patent Application Serial No. 60/263,310, filed Jan. 22, 2001, and incorporates the contents by reference.

BACKGROUND OF THE INVENTION

1. Field of the Invention

This invention pertains to a carrying case for musical instruments that also functions as a stand to securely support the instrument in a readily accessible position when it is not being used. More specifically, it pertains to a carrying case with a completely removable top, and a bottom portion that is hinged or jointed across its width allowing the bottom portion to fold into a stable stand.

2. Description of the Related Art

Combination carrying cases and stands for musical instruments exist in the prior art. U.S. Pat. No. 1,772,308, issued to Ezzelle on Aug. 5, 1930, discloses a combination carrying case and stand for Hawaiin steel guitars that incorporates folding legs to allow the rectangular case to serve as a stand to hold the guitar horizontally while it is played. U.S. Pat. No. 1,986,703, issued to Baker on Jan. 1, 1935, discloses a case for those types of stringed instruments played with bows, such as violins. The Baker invention comprises a stand-type apparatus that requires the use of the bow to hold the instrument at an upright angle from the case when the case is laid open longitudinally on a horizontal surface. U.S. Pat. No. 4,147,254, issued to Bruce on Apr. 3, 1979, discloses a case that can become a stand when the front panels are opened to the extent that they can support the case in an upright, tilted position, holding the instrument inside. Variations of the Bruce design are also disclosed in U.S. Pat. No. 4,474,290, issued to DeMato on Oct. 2, 1984, U.S. Pat. No. 4,223,785, issued to Jacques on Sep. 23, 1980, and U.S. Pat. No. 5,833,051, issued to Tiefenbrun et al. On Nov. 10, 1998.

The aforementioned prior art designs have several drawbacks. Some of them are not adaptable to a variety of instruments, i.e., require a bow to adequately stabilize the instrument in an upright position when not in use. Those that require the case to be laid flat on the floor take up too much space to be of use in some settings with limited space. Those that utilize the closing doors or panels in full or partially opened positions to support the case in an upright or partially upright/tilted position save floor space but sacrifice stability. One of the designs requires the use of bladders to form the stabilizing portion of the stand, offering greater stability but with the drawback of requiring the user to take too many steps to turn the case into a usable instrument stand.

BRIEF SUMMARY OF THE INVENTION

The present invention overcomes the disadvantages of the prior art discussed above and provides additional advantages. It is a combination case and stand that when used in transport, has the appearance and simple functionality of a standard instrument case. To use the case as an instrument stand, the top can be completely removed, and the remaining bottom portion which holds the instrument is hinged or jointed transversely such that it can be folded over to form a very stable, simple, stand. It is the ability of the bottom portion to fold that provides the main advantage over previous designs. With the folding bottom, the present invention takes up minimal space and extends the top of the instrument above the confines of the case for easier access by the musician than any of the previously disclosed designs. With its increased stability, the present invention can be utilized with very light weight materials. Further, it requires no weight increasing parts over what is needed for a standard carrying case, and is simpler to use than the prior art designs. Other advantages include the ability for an instrument strap to be used without getting caught on the stand, protection for the instrument body while resting in the stand, and, as a carrying case, it is a standard size allowing it to easily stack with like cases or even with standard carrying cases. In addition, as a stand, the accessory pocket becomes a fold-down shelf.

BRIEF DESCRIPTION OF THE DRAWINGS

These and other advantages of the invention may will become more clearly understood with reference to the specification and the drawings, in which.

DETAILED DESCRIPTION OF THE INVENTION

Figure 1:
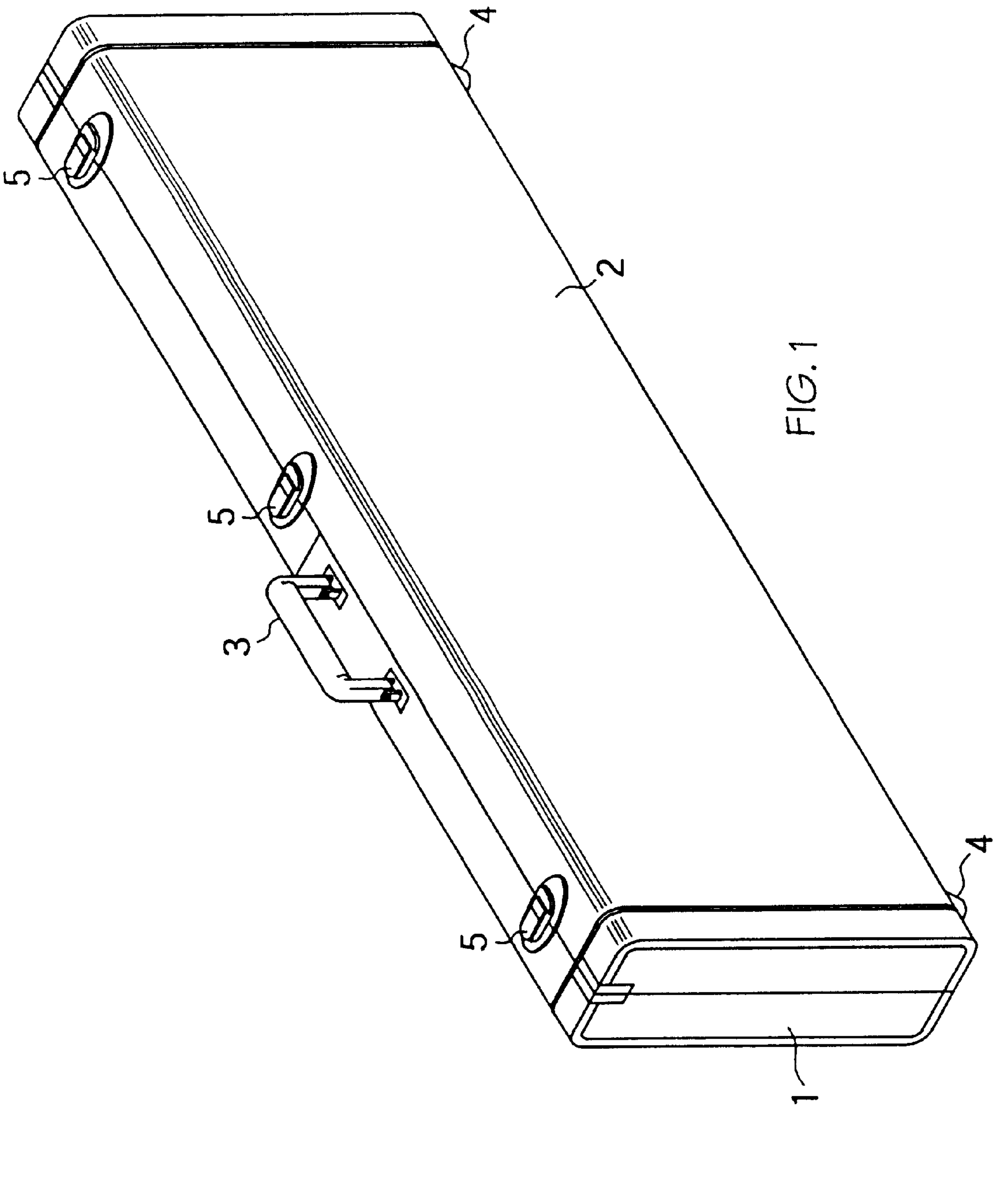
FIG. 1 depicts an embodiment of the invention as a guitar case in the closed position ready for transport showing particularly the removable top portion of the case.
Figure 2:
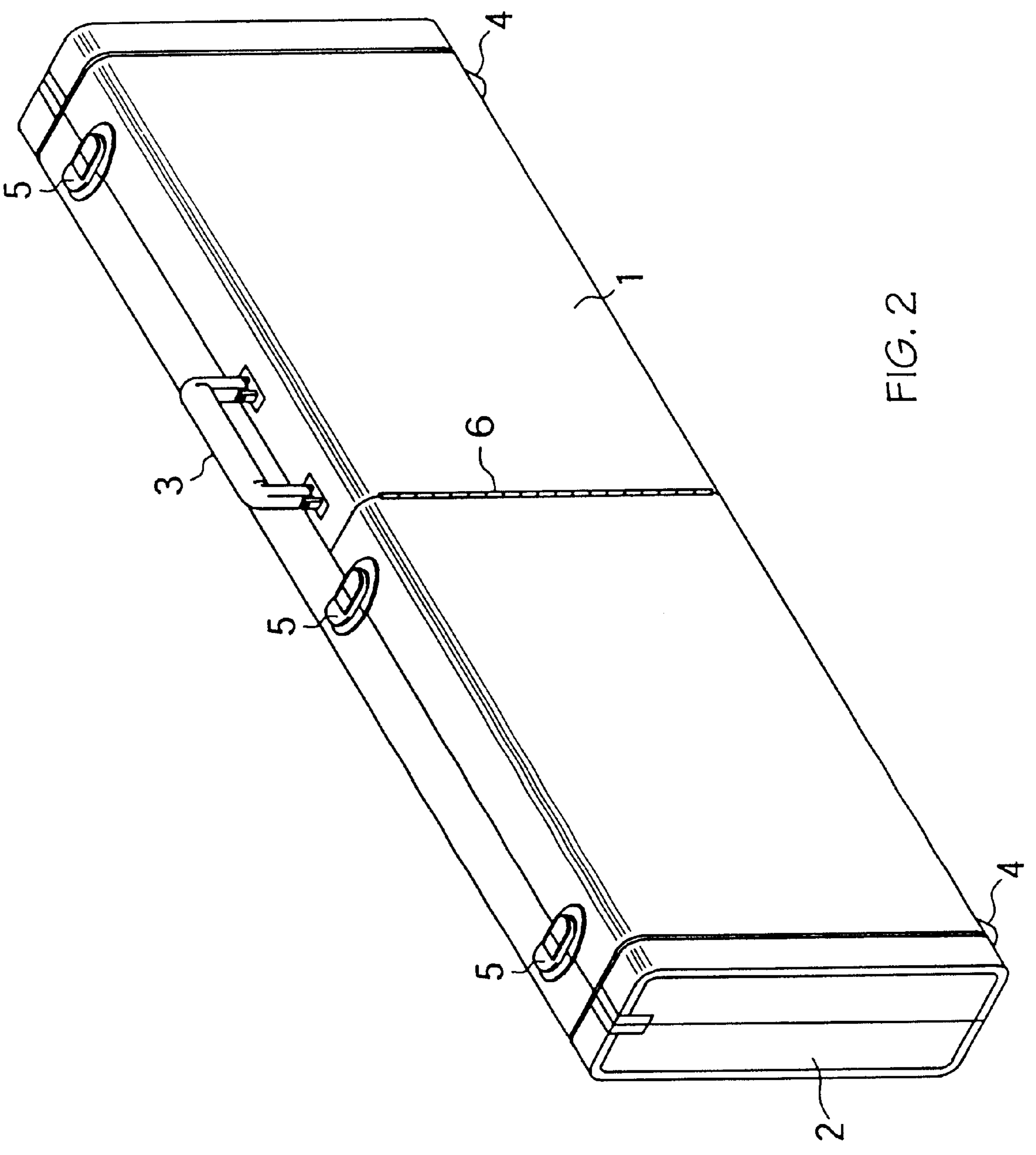
FIG. 2 depicts an embodiment of the invention as a guitar case in the closed position ready for transport, showing particularly the bottom portion of the case.
Figure 3:
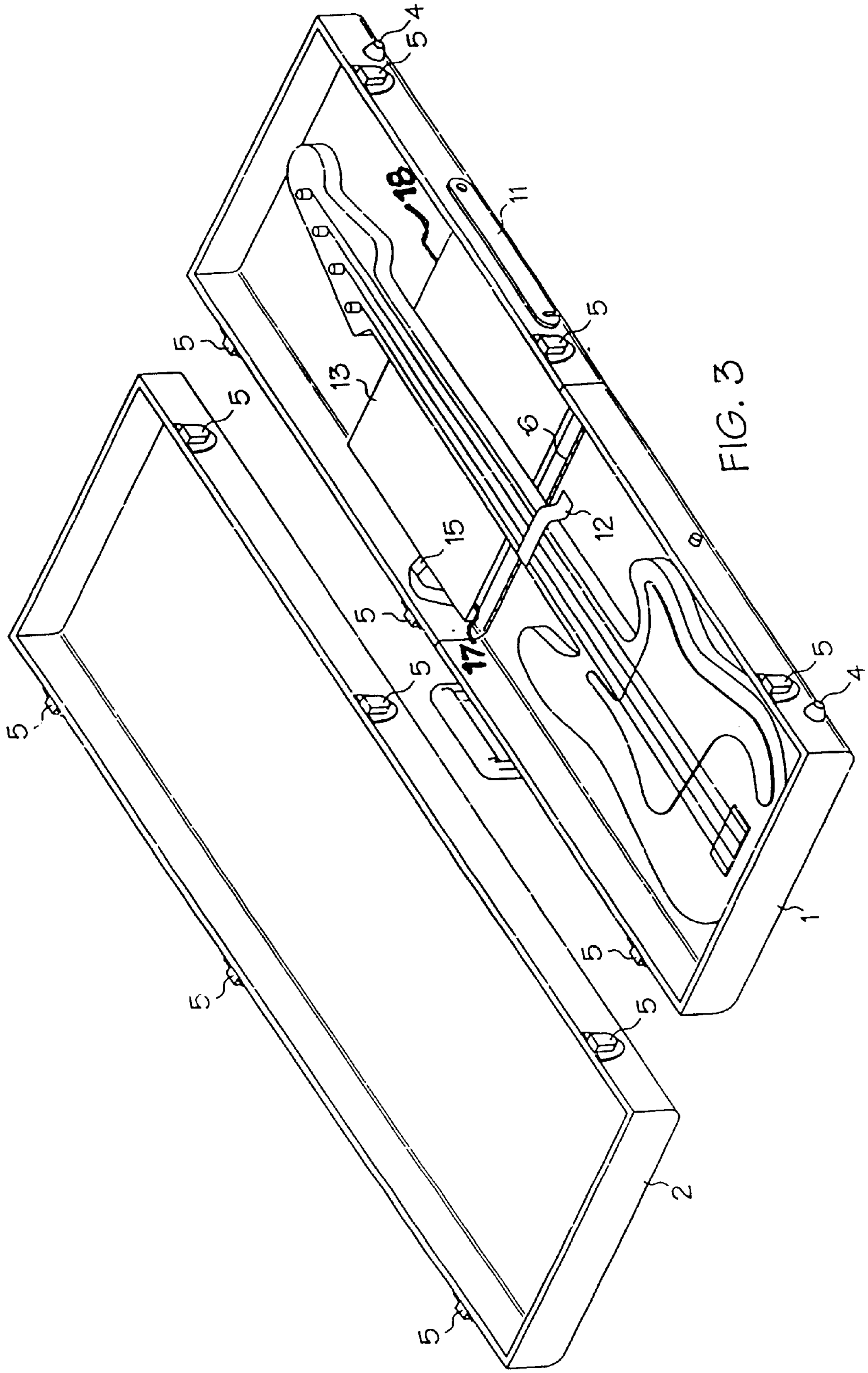
FIG. 3 depicts an embodiment of the invention as a guitar case in the open position.

As depicted in FIGS. 1–5, the present invention is a combination musical instrument case and stand comprising a bottom portion (1) for receiving a musical instrument, and a top portion (2) that can be securely attached to the bottom portion (1) in any suitable manner, to provide a secure carrying case for any variety of musical instrument. When the case is configured for transport, as shown in FIGS. 1 and 2, the top portion (2) becomes the front of the case, as depicted in FIG. 2, and the bottom portion (1) becomes the back of the case, as depicted in FIG. 3. For simplicity, however, the aforementioned portions will be consistently referred to as the top portion (2) and the bottom portion (1) throughout the remainder of the DETAILED DESCRIPTION OF THE INVENTION. A handle (3) may be attached to the case by any suitable means to assist the user in carrying the case in its closed configuration. Feet (4) or other elevating devices may be attached, as depicted in FIGS. 1–3, to the edges of the top portion (2) and bottom portion (1) to elevate the case slightly above the ground or floor when it is set down during transport or storage.

Figure 4:
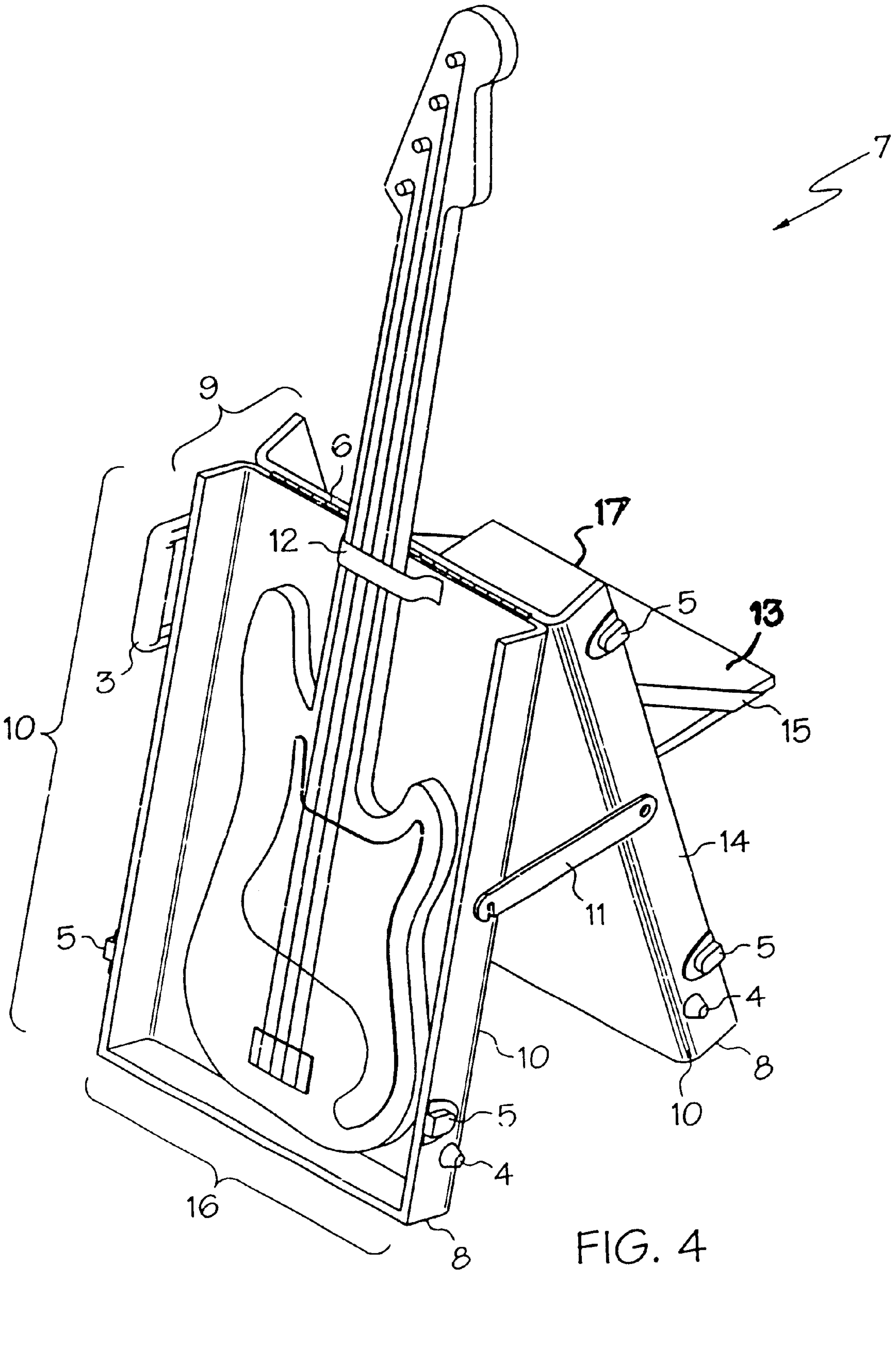
FIG. 4 depicts an embodiment of the invention as a guitar stand with the top portion completely removed, and the bottom portion folded backward into an "A" shaped stand, and also depicts the fold-down shelf feature.
Figure 5:
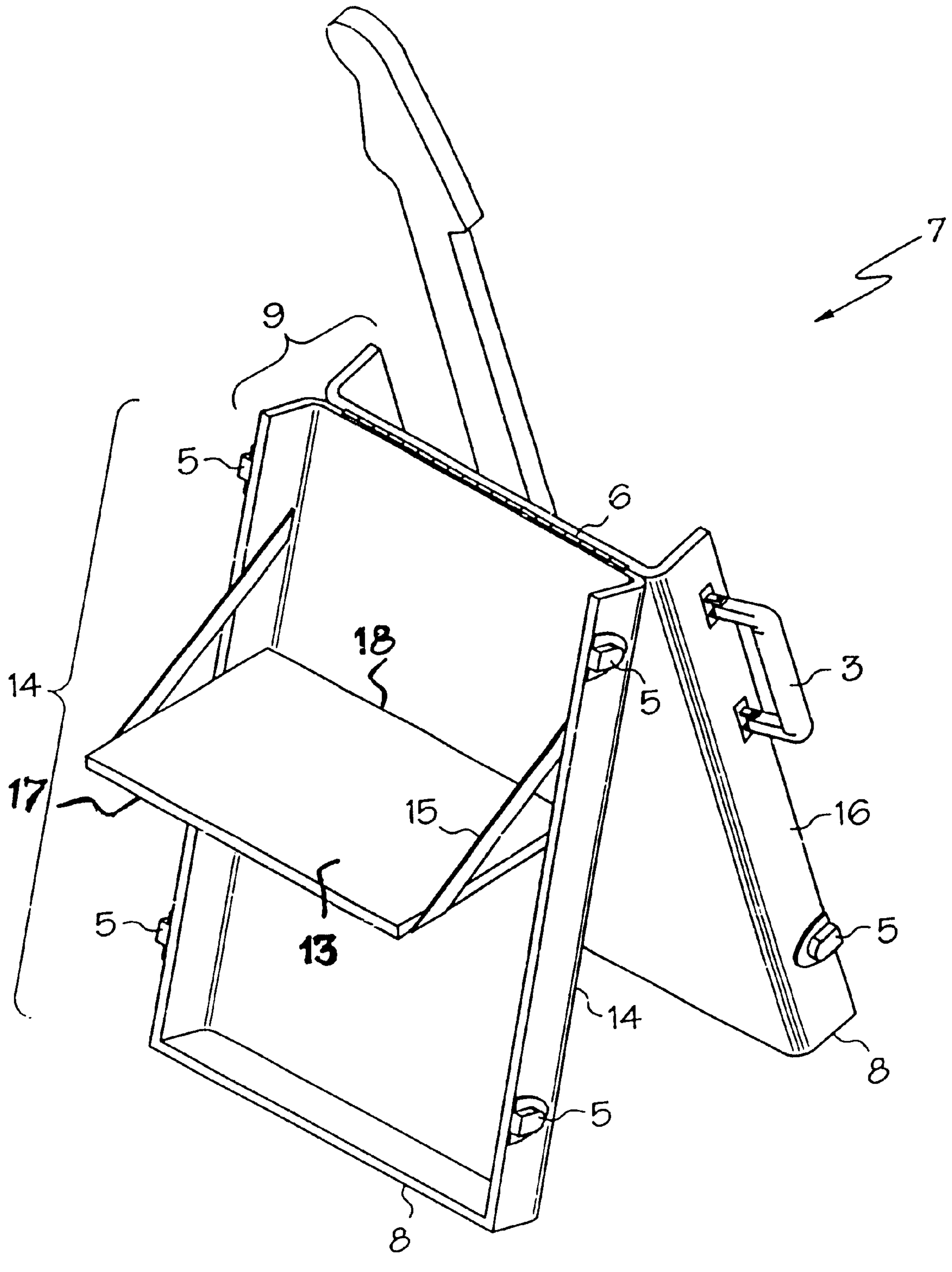
FIG. 5 depicts a different perspective of FIG. 4.

In order to facilitate its use as a stand, the top portion (2) can be completely removed from the bottom portion (1) by the use of breakaway latches (5), or other suitable fasteners. These breakaway latches (5), well known in the art, also permit the top portion (2) to be raised like a lid that remains attached to the bottom portion (1), allowing simple removal of the instrument when the stand feature is not needed, as depicted in FIGS. 3–5. As illustrated in FIGS. 2 and 4, the bottom portion (1) is equipped with a hinge (6) or some other suitable joint, allowing the bottom portion (1) to be folded at the hinge (6) or joint such that it forms a stand (7), resting on its two ends (8), as depicted in FIGS. 4 and 5. In this configuration, the hinge (6) or joint forms the top of the stand (7), with the supporting sides (10) of the stand (7) formed by the two rigid segments extending from either side of the hinge (6) or joint down to the ends (8) upon which the stand (7) rests. The stand (7) can then be stabilized with a cross bar (11) that attaches to the two supporting sides (10) of the stand (7), as depicted in FIG. 4. The stand (7) can also be stabilized with a similarly placed strap, stoppers or bumpers placed on the floor, or by fabricating the hinge (6) or joint such that it will only allow the bottom portion (1) to fold back to the extent of a stable configuration or such that when folded back fully the hinge (6) or joint locks or snaps securely into a stable position. Those skilled in the art will recognize that other means for providing stability are available and well-known.

A strap (12), as depicted in FIG. 4 securing the neck of the guitar, can be utilized to provide additional stability for the instrument. The size and location of the strap (12) may vary depending upon the type of instrument being secured. Those skilled in the art will recognize that other means of securing the instrument can be utilized in the present invention as well, such as contours within the case, bars, baffles, etc.

Shelves, such as the drop-down shelf(13) depicted in FIGS. 4 and 5 extending from the back portion (14) of the stand (7) can be incorporated, as can pockets or any other useful device that can fit in the case while in its case configuration. The design of the drop-down shelf (13) is novel in that it can function as a pocket or folder, while the invention is in the case configuration, as depicted in FIG. 3. When the invention is configured as a stand (7), as depicted in FIGS. 4 and 5, the shelf (13) can function as a drop-down shelf (13). This functionality can be accomplished by movably attaching the attached end (18) of the drop-down shelf(13) or pocket to the case via hinges, a rod, straps, or any other method well known in the art, such that the free end (17) of the drop-down shelf (13) can swing up to lie flat as a pocket, or down into a perpendicular position to form the drop-down shelf (13). To stabilize the drop-down shelf (13) in the lowered position, straps (15), can be attached as shown in FIGS. 4 and 5, or other well known shelf support devices can be employed, such as those that support the shelf from underneath.

In the preferred embodiment, depicted in FIGS. 1–5, the case is designed for a guitar. The body of the case is fashioned from wood. The wood is then covered with vinyl, and the hinges or joints are mounted. The interior of the case is sized to accommodate a standard electrical guitar. It has padding to add extra protection, and is lined with a plush material.

Also in the preferred embodiment, the bottom portion (1), which contains the instrument, is deeper than the top portion (2) that forms the lid. The exterior dimensions of the bottom portion (1) are 49"×16.5"×3", and the exterior dimensions of the top portion (2) are 49"×16.5"×2". The bottom portion (1) of the case is equipped with a handle (3) that is pivotally attached. It is optimally located to provide a stable center of gravity during carrying, by locating it closer to the end containing the heaviest part of the instrument.

Also in the preferred embodiment, as depicted in FIGS. 1–5, both the top portion (2) and bottom portion (1) of the case are equipped with corresponding steel feet (4) that elevate the case off the ground or floor when it is set down during use as a carrying case. The steel feet (4) are attached on the side of the case that the case would be set down on during transport and storage, which side is opposite from the side where the handle (3) is located. In the preferred embodiment, there are four steel feet (4) that protect both the hardware and exterior material of the case. The feet (4) can be firmly attached in any suitable manner known in the art.

Also in the preferred embodiment, as depicted in FIGS. 2 and 3, the bottom portion (1) of the case is fabricated with a hinge (6) or joint across the width that allows the bottom portion (1) to be folded backwards, as depicted in FIGS. 4 and 5, to create the A-shaped stand (7) configuration. The hinge (6) or joint is located 25 inches from the end containing the body of the guitar, such that when the invention is in the stand (7) configuration, almost the entire neck of the guitar extends outside of the stand (7). The preferred embodiment incorporates a cross bar (11) that forms the cross of the "A" of the A-shaped stand (7) for stability. The cross bar (11) is made of metal and contains two holes that are shaped so that they can receive round mounting studs attached to the case. The cross bar (11) is movably attached so that it can fasten tightly over the studs. A strap (12) removably snaps across front portion (16) of the stand (7) to secure the emerging neck of the guitar, as depicted in FIG. 4. A drop-down shelf (13) is provided on the back portion (14) of the stand (7) configuration, as depicted in FIGS. 4 and 5. The drop-down shelf (13) is made of wood and it may be folded down while the invention is in the stand (7) configuration. Alternatively, the drop-down shelf (13) lies flat inside the case when the invention is in the case configuration.

In the preferred embodiment, the top portion (2) is securely and removably attached to the bottom portion (1) via six breakaway latches (5). The six of the breakaway latches (5) are located along the periphery of the case, and allow the case to be hinged open without releasing the breakaway latches (5), as well as allowing for complete removal of the top portion (2). This type of latch is well known to those skilled in the art. The breakaway latches (5) are made of steel with the hinge portions located on the bottom portion (1) of the case, and the mates correspondingly located on the top portion (2) of the case.

Figure 6:
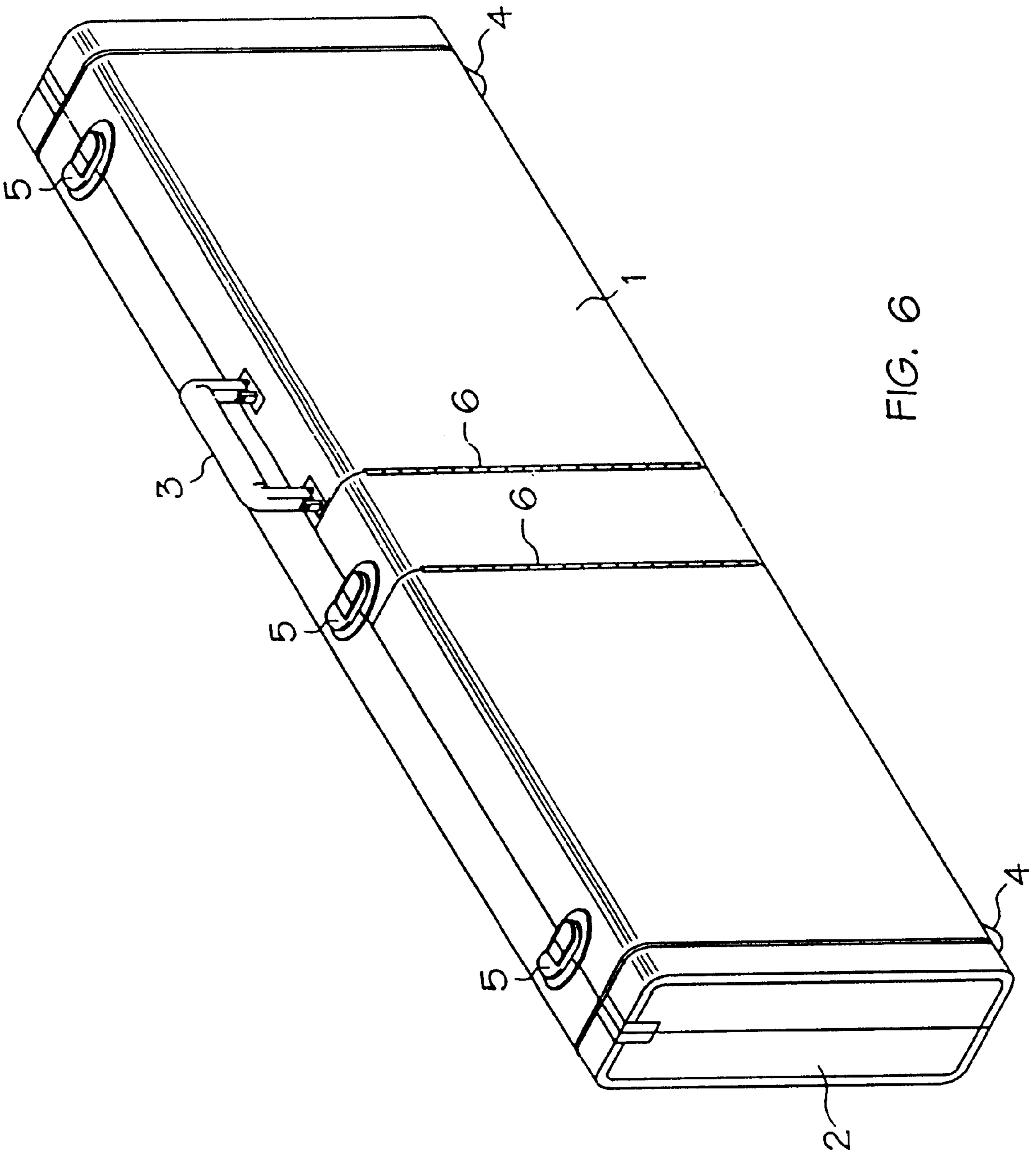
FIG. 6 depicts an alternative embodiment of the invention as a guitar case in the closed position ready for transport showing particularly the bottom portion of the case having more than one hinge.

The present invention is not limited to stands having a portion with only two segments separated by a single joint. For example, a stand with a bottom portion or a top portion segmented by two or more joints into three or more segments, such that one or more of the segments is foldable to create a supportive stand would also be within the spirit and scope of the present invention. One example of such a stand is depicted in FIG. 6, wherein there are two hinges (6) on the bottom portion (1) of the case.

Although FIGS. 1–5 depict the present invention in a configuration suitable for guitars, it will be readily apparent to those skilled in the art that the present invention can be applied as well to case configurations for many other types of instruments, or items other than musical instruments. The present invention can be utilized with any material that is sufficiently rigid, as well as in a variety of case sizes and shapes. The interior can be lined and contoured in any manner desired. Securing straps and cross bars, if used, can be attached in a variety of ways, i.e. by using snaps and bolts as depicted, VELCRO®, or any other suitable means. A variety of shelves, pockets, or like devices can be added. Handles, latches, feet, joints, and other such elements can be altered and modified without deviating from the spirit of this invention. Those skilled in the art will be able to envision unlimited configurations for cases that incorporate the present invention so as to be usable as a stand.

What is claimed is:

1. A carrying case for musical instruments that also functions as a musical instrument stand comprising:

a bottom portion;

a top portion;

said bottom portion and said top portion designed to fit together such that when joined together in a closed configuration said bottom portion and said top portion form a case that is configured to accommodate and completely enclose a musical instrument;

said bottom portion being segmented by a joint into two segments;

each of said two segments having a jointed end and a non-jointed end;

said two segments configured to be movably joined at said joint into a stand configuration that has a stand top and two supporting sides, such that said joint forms said stand top and said two segments form said supporting sides of said stand with said stand resting on said non-jointed ends of said two segments; and, one of said two supporting sides being configured to hold and support the musical instrument in a rest position.

2. The carrying case for musical instruments that also functions as a musical instrument stand of claim 1 wherein it is said top portion rather than said bottom portion that is segmented and configured to be foldable into said stand configuration and holding the musical instrument while in said stand configuration.

3. The carrying case for musical instruments that also functions as a musical instrument stand of claim 1 wherein said bottom portion or said top portion are segmented by two or more joints into three or more segments, such that one or more of said three or more segments is configured to be foldable into a supportive stand for the musical instrument.

4. The carrying case for musical instruments that also functions as a musical instrument stand of claim 1 wherein said top portion and said bottom portion are removably joined together by latches such that said top portion is configured to be completely removed from said bottom portion, and said top portion is configured to be raised from said bottom portion to function as a lid, with said top portion remaining movably attached on one end to said bottom portion.

5. The carrying case for musical instruments that also functions as a musical instrument stand of claim 1 further comprising a cross member:

said cross member having a first end and a second end;

said cross member and said two supporting sides being designed such that said cross member is attachable to said two supporting ends by attaching said first end of said cross member to one of said two supporting sides and by further attaching said second end of said cross bar to the other of said two supporting sides; and said cross bar so attached thereby adding additional stability to said stand configuration.

6. The carrying case for musical instruments that also functions as a musical instrument stand of claim 1 further comprising a stabilizing apparatus to provide additional stability to said two supporting sides.

7. A carrying case for musical instruments that also functions as a musical instrument stand comprising:

a bottom portion;

said bottom portion having an interior and an exterior;

a top portion;

said top portion having an interior and an exterior;

said bottom portion configured to receive and accommodate a musical instrument in said interior;

said top portion configured to close over said bottom portion to form a case that fully encloses the musical instrument;

latches;

said latches mounted peripherally to said bottom portion and said top portion to securely hold said bottom portion and said top portion together when said case is closed;

said bottom portion segmented by a hinge into two segments;

each of said two segments having a jointed end and a non-jointed end;

said two segments configured to be movably joined at said joint into a stand configuration that has a stand top and two supporting sides, such that said joint forms said stand top and said two segments form said supporting sides of said stand with said stand resting on said non-jointed ends of said two segments; and, said two supporting sides being slanted from vertical and one of said two supporting sides being sufficiently indented to hold and support the musical instrument in a rest position.

8. The carrying case for musical instruments that also functions as a musical instrument stand of claim 7 wherein said bottom portion is configured to receive and accommodate items other than musical instruments and as a stand one of said two supporting sides being configured to hold and support the items other than musical instruments in a rest position.

9. The carrying case for musical instruments that also functions as a musical instrument stand of claim 7 further comprising:

a combination pocket and drop-down shelf;

said combination comprising a four sided member wherein one side is an attached side, the side opposite said attached side is a free side, and the remaining two sides that join said attached side and said free side are removably attached sides;

said attached side being movably attached to said interior of said top portion or said interior of said bottom portion such that said free side is configured to move about said attached side;

said free side capable of being moved about said attached end such that said free side is configured to lie flat against said interior and function as a pocket;

said two removably attached sides being fabricated to removably attach to said interior to complete said pocket;

said free side also capable of being moved away from said interior to extend from said interior as a drop-down shelf; and, an apparatus to support said drop down shelf in said extended position.

10. The carrying case for musical instruments that also functions as a musical instrument stand of claim 9 wherein said apparatus to support said drop down shelf comprises two straps that each attach at one end to said interior and at the other end to said free side.

11. The carrying case for musical instruments that also functions as a musical instrument stand of claim 9 wherein said removably attached sides are fabricated with velcro to removably attach to said interior.

* * * * *